(12) United States Patent
Chueh et al.

(10) Patent No.: US 9,742,298 B2
(45) Date of Patent: Aug. 22, 2017

(54) TRANSFORMER AND CONTROL METHOD THEREOF

(71) Applicants: QISDA (SUZHOU) CO., Ltd., Suzhou, Jiangsu Province (CN); QISDA CORPORATION, Taoyuan (TW)

(72) Inventors: Chin-Sheng Chueh, Taoyuan (TW); Yen-Chien Chen, Taoyuan (TW); Tung-Hsien Tsai, Taoyuan (TW); Po-Wen Wang, Taoyuan (TW)

(73) Assignees: Qisda (Suzhou) Co., LTD., Suzhou (CN); Qisda Corporation, Taoyuan (TW)

( * ) Notice: Subject to any disclaimer, the term of this patent is extended or adjusted under 35 U.S.C. 154(b) by 31 days.

(21) Appl. No.: 14/816,074

(22) Filed: Aug. 3, 2015

(65) Prior Publication Data
US 2016/0049875 A1    Feb. 18, 2016

(30) Foreign Application Priority Data

Aug. 13, 2014 (TW) .............................. 103127841 A

(51) Int. Cl.
*H02M 3/335* (2006.01)
(52) U.S. Cl.
CPC .............. *H02M 3/33576* (2013.01)
(58) Field of Classification Search
CPC ......... H02M 3/33576; H02M 3/33523; H02M 3/33538; H02M 3/33553; H02M 3/33569; G05F 1/14; G05F 1/20; H01F 29/02; H01F 29/025; H01F 29/04

USPC .... 323/255, 258, 340, 343; 363/21.04, 21.1, 363/21.12, 21.18, 21.01
See application file for complete search history.

(56) References Cited

U.S. PATENT DOCUMENTS

| 6,320,764 B1* | 11/2001 | Jiang ................. H02M 3/33523 |
| | | 323/255 |
| 8,203,319 B2* | 6/2012 | Fujita ................... H01H 9/0011 |
| | | 323/255 |
| 2006/0120114 A1* | 6/2006 | Kawasaki ......... H02M 3/33592 |
| | | 363/16 |
| 2007/0047266 A1* | 3/2007 | Nakahori ................ H02M 3/28 |
| | | 363/17 |

(Continued)

FOREIGN PATENT DOCUMENTS

| CN | 1352482 A | 6/2002 |
| JP | H03128628 A | 5/1991 |

*Primary Examiner* — Alex Torres-Rivera

(57) ABSTRACT

A transformer includes a first switch, a first winding, a second winding, a third winding, a first current direction control unit, a second current direction control unit and a loading capacitor. The first switch is coupled between the second winding and the third winding. The first winding is disposed at a primary side and coupled between an input voltage terminal and a first ground. The second winding is disposed at a secondary side and coupled between a second ground and the first switch. The third winding is disposed at the secondary side. The first current direction control unit is coupled between the second winding and an output voltage terminal. The second current direction control unit is coupled between the third winding and the output voltage terminal. The first switch is turned on for adjusting a winding ratio when the transformer is used to output a high voltage.

14 Claims, 7 Drawing Sheets

(56) References Cited

U.S. PATENT DOCUMENTS

| | | | | |
|---|---|---|---|---|
| 2009/0129127 A1* | 5/2009 | Shi | .......................... | H02M 1/36 |
| | | | | 363/49 |
| 2011/0103100 A1* | 5/2011 | Hosotani | ................... | H01F 3/10 |
| | | | | 363/21.02 |
| 2012/0056549 A1* | 3/2012 | Muramatsu | ........ | H05B 41/2882 |
| | | | | 315/223 |
| 2013/0181509 A1* | 7/2013 | Rieux-Lopez | ........ | H02M 3/335 |
| | | | | 307/9.1 |
| 2014/0153290 A1* | 6/2014 | Li | ....................... | H02M 3/3376 |
| | | | | 363/17 |
| 2014/0328088 A1* | 11/2014 | Wang | ................ | H02M 3/33507 |
| | | | | 363/21.08 |

* cited by examiner

US 9,742,298 B2

TRANSFORMER AND CONTROL METHOD THEREOF

CROSS REFERENCE TO RELATED APPLICATION

This application claims priority to Taiwan Patent Application No. 103127841, filed Aug. 13, 2014, and incorporated herein by reference in its entirety.

BACKGROUND OF THE INVENTION

1. Field of the Invention

The present invention relates to a transformer, and more particularly, a transformer having the number of turns being adjustable according to an outputted voltage.

2. Description of the Prior Art

A transformer may transform an alternating current (AC) or a direct current (DC) power to a DC power of a specific range, so it is widely adopted in the field of electrical equipment and power supply. Most commonly used transformers include flyback transformers (FBT), forward transformers and push-pull transformers. FIG. 1 illustrates a transformer 100 according to the prior art. The transformer 100 includes a winding Ta having a number of turns Na and a winding Tb (disposed at a secondary side) having a number of turns Nb so as to have a winding ratio as Na/Nb. The winding Ta is disposed at a primary side and coupled to an input power supply Vi. The winding Tb is disposed at a secondary side and coupled to an output voltage terminal Vo. The winding Ta is controlled by a pulse-width modulation (PWM) signal Vp outputted from a PWM unit 110. The PWM signal Vp has a duty cycle, and an ideal value of the duty cycle is 50%. However, the duty cycle varies according to the winding ratio Na/Nb and an output voltage at the output voltage terminal Vo. If the winding ratio remains unchanged, the PWM unit 110 is controlled by a feedback circuitry to increase the duty cycle when the output voltage increases, and the duty cycle is decreased when the output voltage decreases.

According to the prior art, when the output voltage varies, the duty cycle is difficult to keep stable. For example, when the input power supply Vi supplies a 90 Volt (V) DC power for the output voltage terminal Vo to output a 5V DC power, the winding ratio Na/Nb may be designed as 48/3 for the duty cycle to be 47.3%, close to the ideal value 50%. However, when winding ratio remains at 48/3, and the output voltage at the output voltage terminal Vo is changed to a higher voltage such as 20V, the duty cycle may increase to be 76.7% so that the duty cycle is too high, unwanted oscillations, overheat and incorrect operations are thus easier to occur, and this is harmful for the reliability of the circuit. For another example, when attempting to receive a 90V AC power from input power supply Vi and output a 20V DC power at the output voltage terminal Vo, the winding ratio Na/Nb maybe selected as 48/10 so as to have a 49.7% duty cycle which is nearly ideal. However, if the winding ratio remains 48/10, when output voltage at the output voltage terminal Vo changes to be 5V, the duty cycle may decrease to be 21.2% and be too low so that the efficiency of the transformer is lowered.

Therefore, when using the transformer 100 of the prior art, when adjusting the output voltage according to various applications, the duty cycle easily gets too high or too low and is difficult to keep stable.

SUMMARY OF THE INVENTION

An embodiment of the present invention discloses a transformer comprising a first winding, a second winding, a first current direction control unit, a third winding, a second current direction control unit, a first switch and a loading capacitor. The first winding is disposed at a primary side, has a first number of turns, and comprises a first terminal coupled to an input voltage terminal and a second terminal coupled to a first ground. The second winding is disposed at a secondary side, has a second number of turns, and comprises a first terminal and a second terminal coupled to a second ground. The first current direction control unit comprises a first terminal coupled to the first terminal of the second winding, and a second terminal coupled to an output voltage terminal. The third winding is disposed at the secondary side, has a third number of turns, and comprises a first terminal and a second terminal. The second current direction control unit comprises a first terminal coupled to the first terminal of the third winding, and a second terminal coupled to the output voltage terminal. The first switch comprises a first terminal coupled to the second terminal of the third winding, a second terminal coupled to the first terminal of the second winding, and a control terminal configured to receive a first switch control signal. The loading capacitor comprises a first terminal coupled to the output voltage terminal, and a second terminal coupled to the second ground.

Another embodiment of the present invention discloses a transformer control method for controlling a transformer. The transformer comprises a first winding disposed at a primary side, a second winding disposed at a secondary side, a third winding disposed at the secondary side, and a first switch coupled between the second winding and the third winding. The method comprises turning off the first switch when the transformer is configured to output a low voltage so that energy stored in the first winding is outputted via the second winding instead of the third winding, and turning on the first switch when the transformer is configured to output a first high voltage so that energy stored in the first winding is outputted via the second winding and the third winding.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
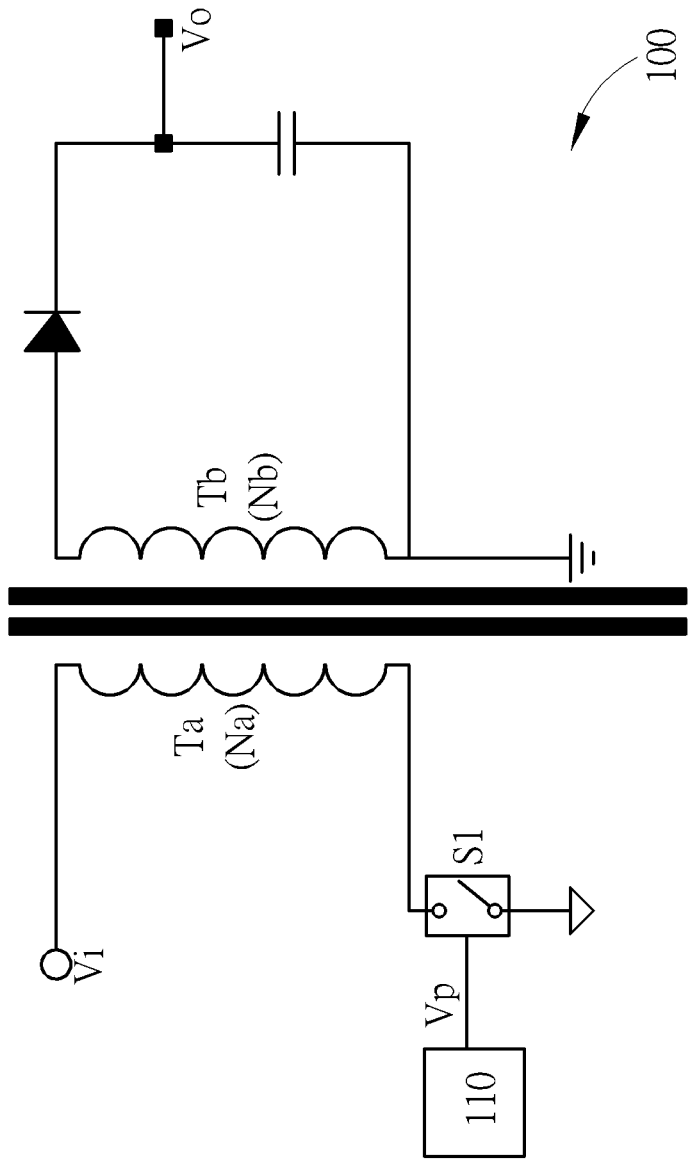
FIG. 1 illustrates a transformer according to the prior art.
Figure 2:
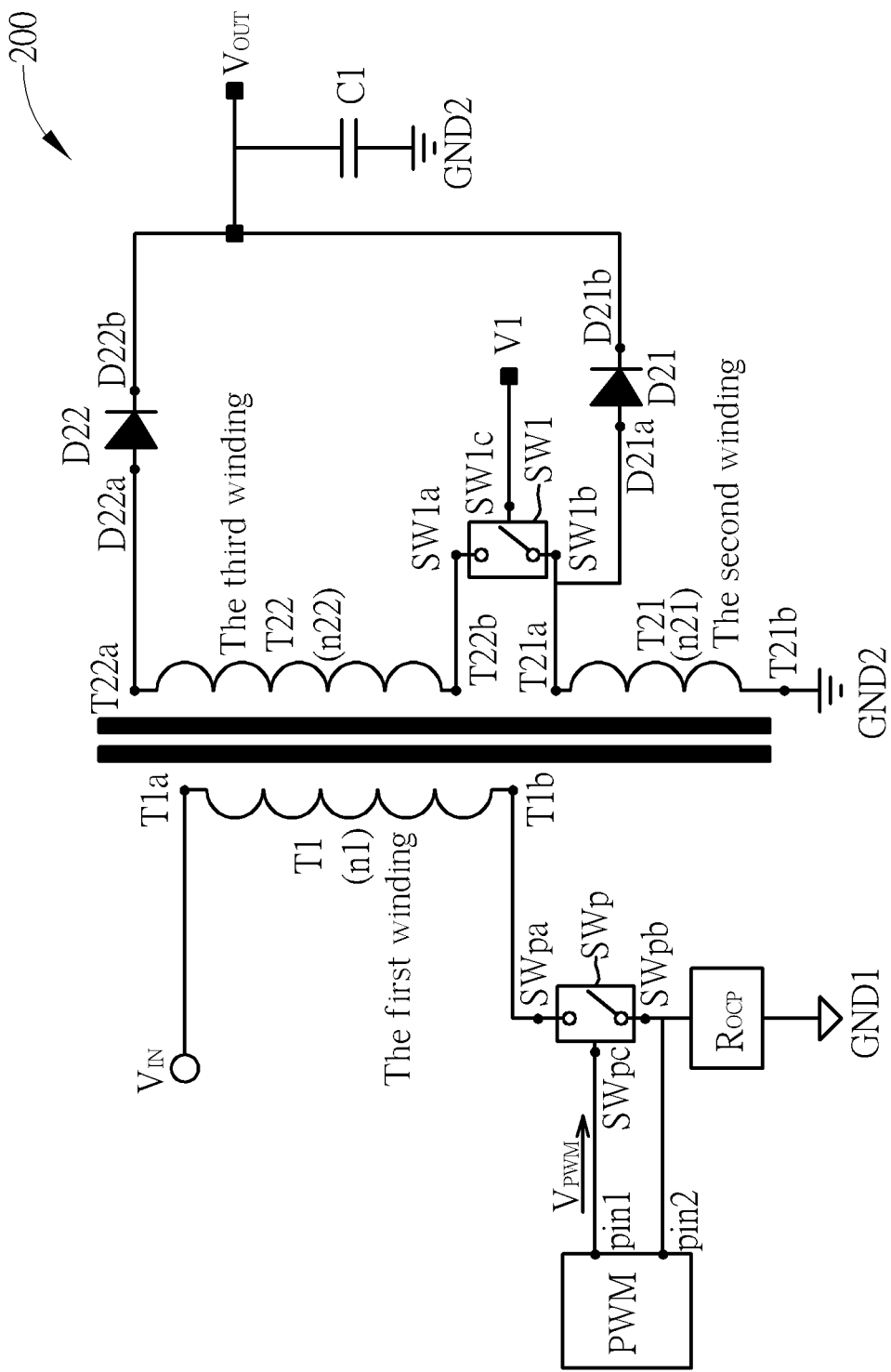
FIG. 2 illustrates a transformer according to an embodiment of the present invention.

FIG. 2 illustrates a transformer 200 according to an embodiment of the present invention. The transformer 200 includes a first winding T1, a second winding T21, a first current direction control unit D21, a third winding T22, a second current direction control unit D22, a first switch SW1 and a loading capacitor C1. The first winding T1 is disposed at a primary side, has a first number of turns n1, and includes a first terminal T1a coupled to an input voltage terminal $V_{IN}$ and a second terminal T1b coupled to a first ground GND1. The second winding T21 is disposed at a secondary side, has a second number of turns n21, and comprises a first terminal T21a and a second terminal T21b coupled to a second ground GND2. The first current direction control unit D21 comprises a first terminal D21a coupled to the first terminal T21a of the second winding T21, and a second terminal D21b coupled to an output voltage terminal $V_{OUT}$. The third winding T22 is disposed at the secondary side, has a third number of turns n22, and comprises a first terminal T22a and a second terminal T22b. The second current direction control unit D22 comprises a first terminal D22a coupled to the first terminal T22a of the third winding T22, and a second terminal D22b coupled to the output voltage terminal $V_{OUT}$. The first switch SW1 comprises a first terminal SW1a coupled to the second terminal T22b of the third winding T22, a second terminal SW1b coupled to the first terminal T21a of the second winding T21, and a control terminal SW1c configured to receive a first switch control signal V1. The loading capacitor C1 comprises a first terminal coupled to the output voltage terminal $V_{OUT}$, and a second terminal coupled to the second ground GND2.

The transformer 200 shown in FIG. 2 also includes a second switch SWp, a pulse-width modulation (PWM) unit PWM, and a resistor $R_{OCP}$. The second switch SWp comprises a first terminal SWpa coupled to the second terminal T1b of the first winding T1, a second terminal SWpb coupled to the first ground GND1, and a control terminal SWpc. The PWM unit PWM comprises a first terminal pin1 coupled to the control terminal SWpc of the second switch SWp, configured to output a PWM signal $V_{PWM}$ to the control terminal SWpc of the second switch SWp, and a second terminal pin2 coupled to the second terminal SWpb of the second switch SWp so that the PWM unit PWM monitors a voltage level of the second terminal SWpb of the second switch. The resistor $R_{OCP}$ is coupled between the second terminal SWpb of the second switch SWp and the first ground GND1. The first ground GND1 and the second ground GND2 are not allowed to be the same ground.

Figure 3:
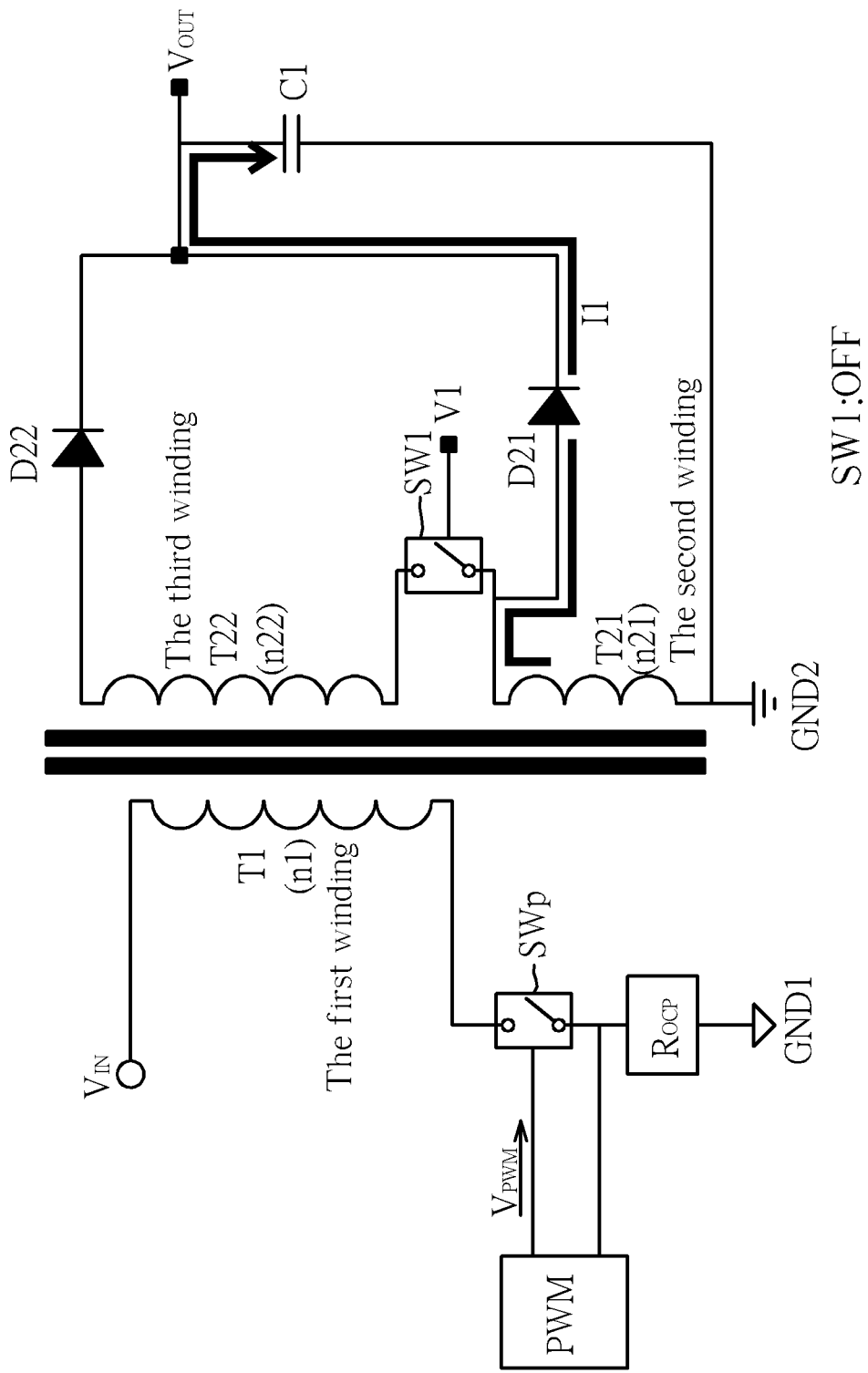
FIG. 3 illustrates a condition in that a low voltage is outputted at the output voltage terminal according to an embodiment of the present invention.
Figure 4:
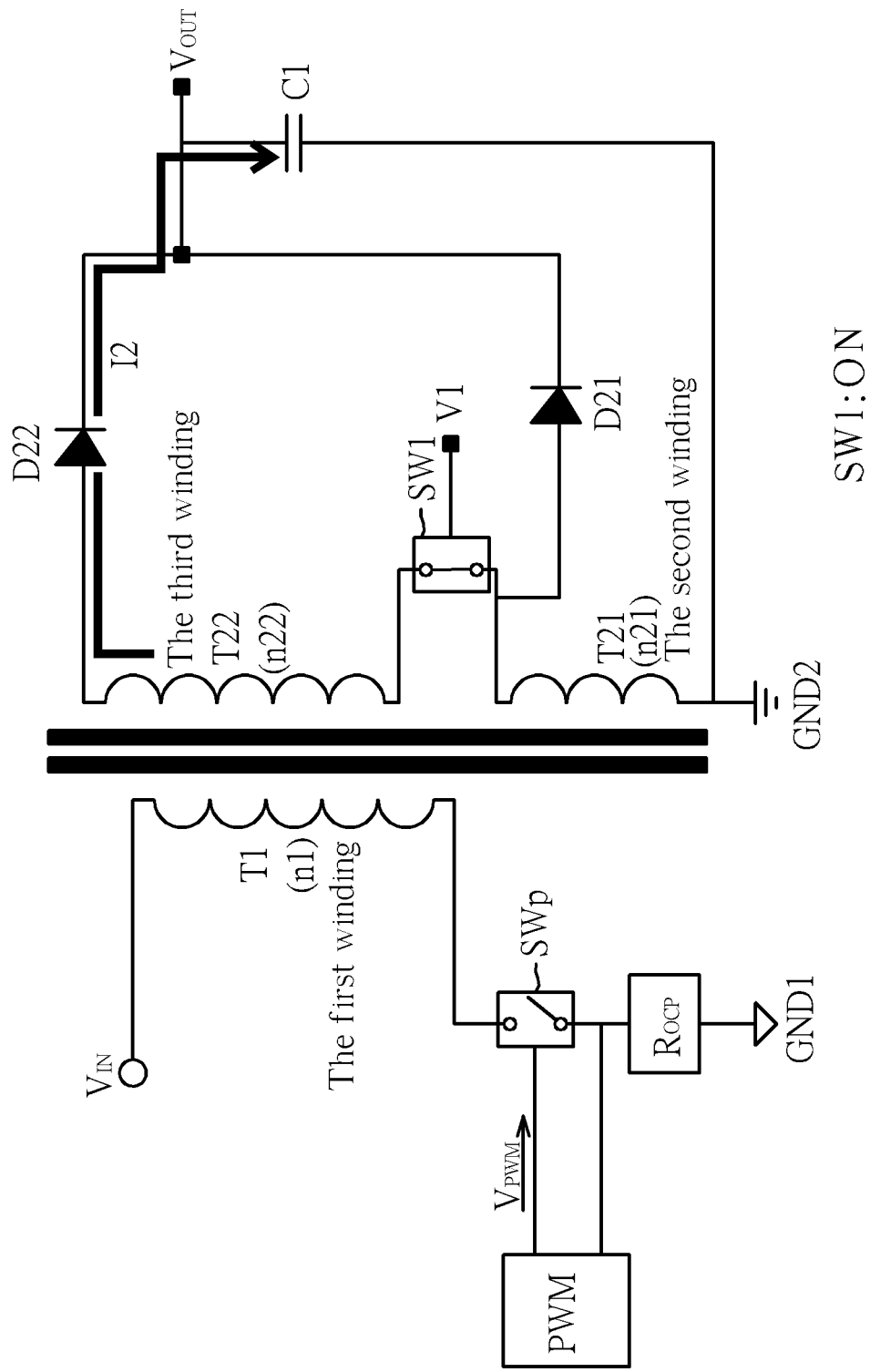
FIG. 4 illustrates another condition in that a high voltage is outputted at the output voltage terminal $V_{OUT}$ according to another embodiment of the present invention.

According to an embodiment of the present invention, the described input voltage terminal $V_{IN}$ may be configured to receive a 90V AC power supply. The first number of turns n1 (of the first winding T1) may be 48, the second number of turns n21 (of the second winding T21) may be 3, and the third number of turns n22 (of the third winding T22) may be 7 for example. FIG. 3 illustrates a condition in that a low voltage is outputted at the output voltage terminal $V_{OUT}$ according to an embodiment of the present invention. FIG. 4 illustrates another condition in that a high voltage is outputted at the output voltage terminal $V_{OUT}$ according to another embodiment of the present invention.

As shown in FIG. 3, when attempting to output a low voltage (e.g. 5V) at the output voltage terminal $V_{OUT}$, the first switch SW1 may be turned off by controlling the control terminal SW1c by the first switch control signal V1 so as for a first current I1 to flow from the first terminal D21a to the second terminal D21b of the first current direction control unit D21 to charge the loading capacitor C1 and generate the low voltage (e.g. 5V) at the output voltage terminal $V_{OUT}$. Since the first switch SW1 is turned off, the third winding T22 and the second current control unit D22 do not operate, and the winding ratio of the primary side to the secondary side of the transformer 200 is a ratio of the first number of turns n1 (e.g. 48) to the second number of turns n21 (e.g. 3), that is, 48/3. Hence, the PWM signal $V_{PWM}$ outputted from the PWM unit PWM may have duty cycle corresponding to the winding ratio (e.g. 48/3) and the output voltage (e.g. 5V), and the duty cycle may be 47.3% being close to the ideal value (50%).

As shown in FIG. 4, when attempting to output a high voltage (e.g. 20V) at the output voltage terminal $V_{OUT}$, the first switch SW1 may be turned on by controlling the control terminal SW1c by the first switch control signal V1 so as for a second current I2 to flow from the first terminal D22a to the second terminal D22b of the second current direction control unit D22 to charge the loading capacitor C1 and generate the high voltage (e.g. 20V) at the output voltage terminal $V_{OUT}$. Since the first switch SW1 is turned on, the first terminal D21a is corresponding to the second number of turns n21 (e.g. 3), and the second terminal D21b is corresponding to a sum of the second number of turns n21 (e.g. 3) and the third number of turns n22 (e.g. 7), that may be, 3+7=10 for example. Hence, a voltage level at the second terminal D21b may be higher than a voltage level at the first terminal D21a to lead to a reverse bias and make no current flow through the first current control unit D21. The winding ratio of the primary side to the secondary side of the transformer 200 may be a ratio of the first number of turns n1 (e.g. 48) to a sum of the second number of turns n21 (e.g. 3) and the third number of turns n22 (e.g. 7), that is, 48/(7+3), or 47/10. Hence, the PWM signal $V_{PWM}$ outputted from the PWM unit PWM may have duty cycle corresponding to the winding ratio (e.g. 48/10) and the output voltage (e.g. 20V), and the duty cycle may be 49.7% being close to the ideal value (50%).

TABLE α

Table - α illustrates the settings of the transformer 200 corresponding to outputting the high voltage and the low voltage.

| Attempted Output voltage | Setting of the first switch SW1 | The number of turns of the primary side | The number of turns of the secondary side | The winding ratio of the primary side to the secondary side | The duty cycle of the PWM signal $V_{PWM}$ (The ideal value is 50%.) |
|---|---|---|---|---|---|
| 5 volt | Turned off | 48 (the first number of turns n1) | 3 (the second number of turns n21) | 48/3 | 47.3% |
| 20 volt | Turned On | 48 (the first number of turns n1) | 10 (the second number of turns n21 + the third number of turns n22) | 48/10 | 49.7% |

Figure 5:
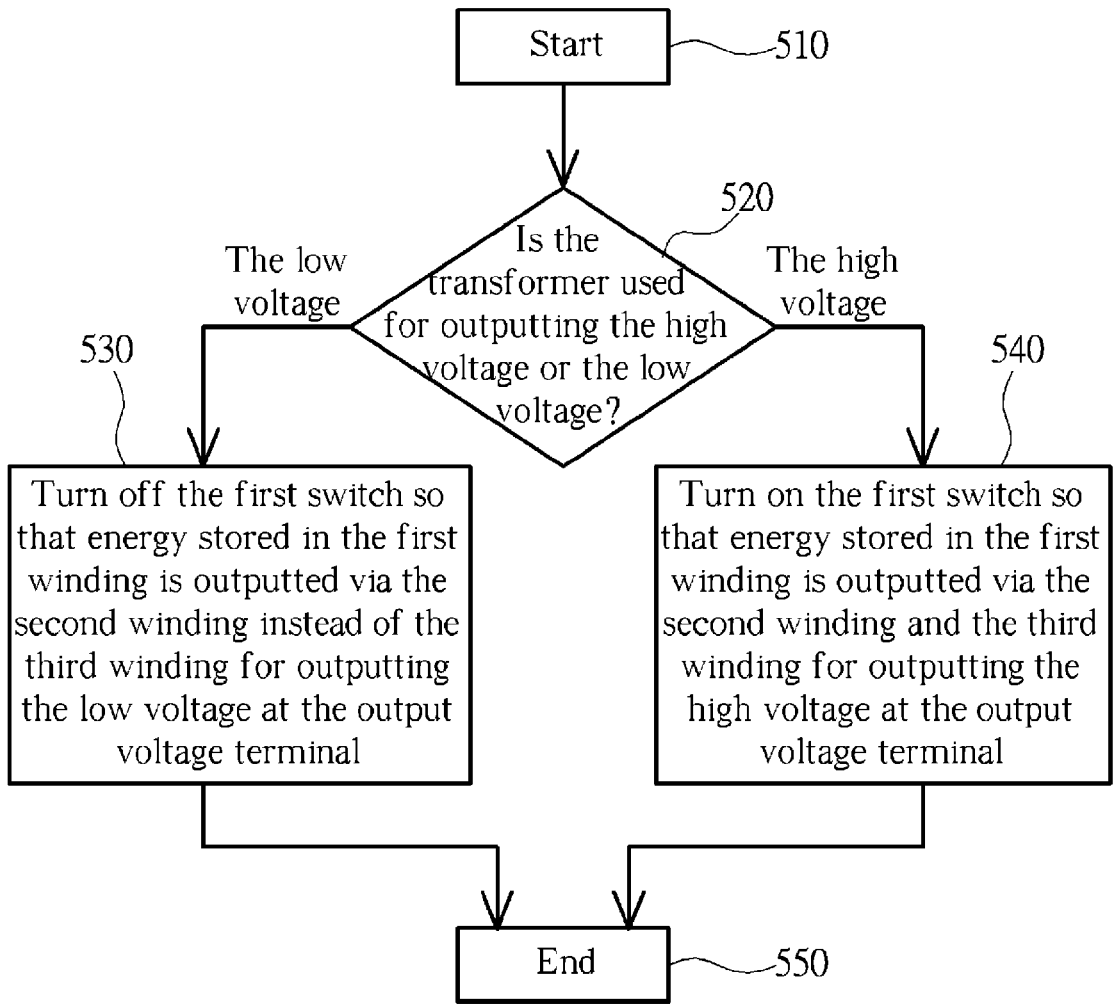
FIG. 5 illustrates a flow chart of a control method for controlling the transformer shown in FIG. 2.

FIG. 5 illustrates a flow chart of a control method 500 for controlling the transformer 200 shown in FIG. 2. The control method 500 may include the following steps.

Step 510: start;

Step 520: Is the transformer 200 used for outputting the high voltage or the low voltage? If it is for outputting the low voltage, go to step 530, and if it is for outputting the high voltage, go to step 540;

Step 530: turn off the first switch SW1 so that energy stored in the first winding T1 is outputted via the second winding T21 instead of the third winding T22 for outputting the low voltage at the output voltage terminal $V_{OUT}$; go to step 550;

Step 540: turn on the first switch SW1 so that energy stored in the first winding T1 is outputted via the second winding T21 and the third winding T22 for outputting the high voltage at the output voltage terminal $V_{OUT}$; go to step 550; and Step 550: end.

The said first current direction control unit D21 may be (but not limited to) a diode, the first terminal D21a may be an anode terminal, and the second terminal D21b may be a cathode terminal of the diode. Similarly, the said second current direction control unit D22 may be (but not limited to) a diode, the first terminal D22a may be an anode terminal, and the second terminal D22b may be a cathode terminal. The first/second current direction control unit D21/D22 may be implemented by a set of diodes connected in series or other sorts of device able to connect the direction of a current.

Figure 6:
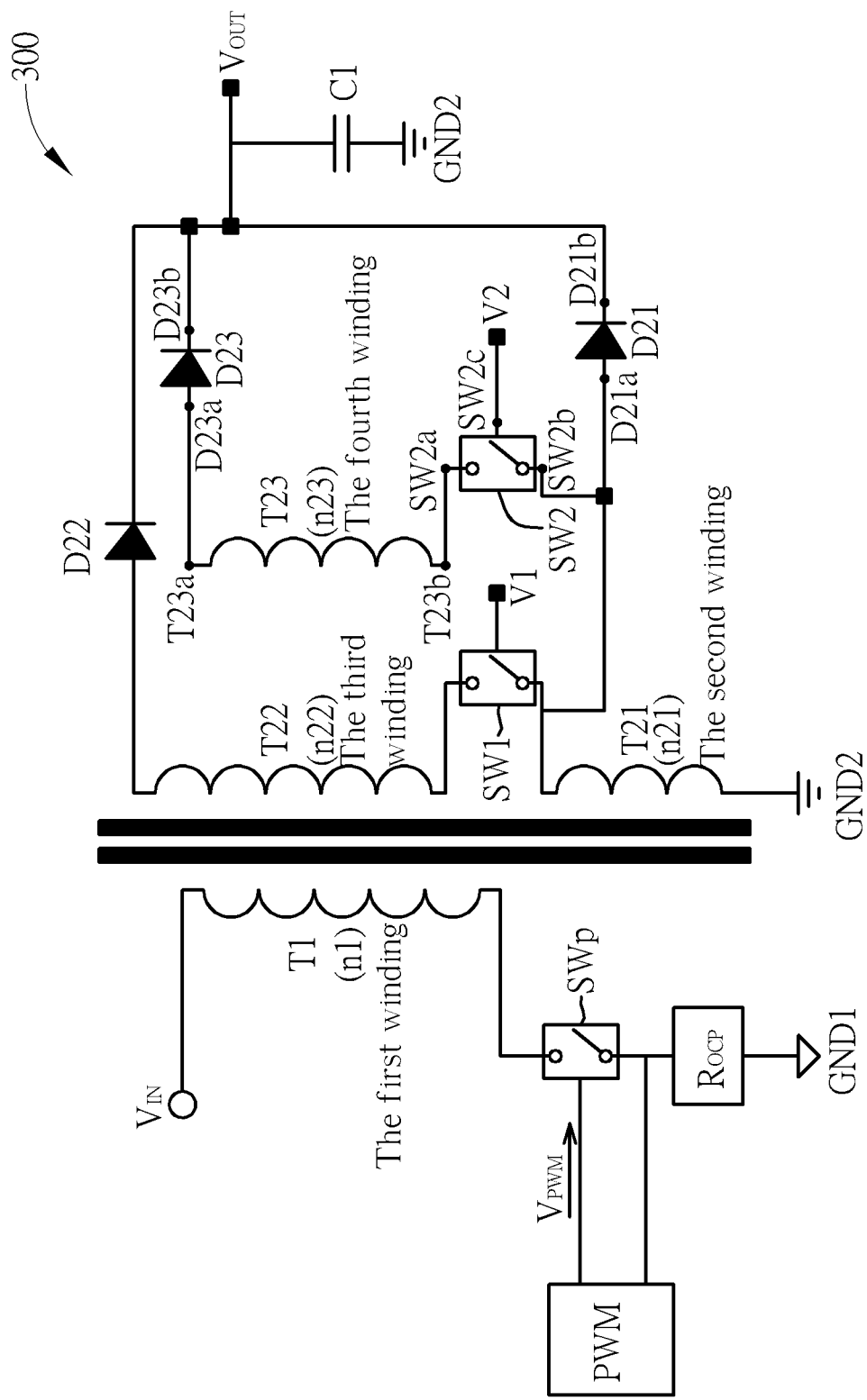
FIG. 6 illustrates a transformer according to another embodiment of the present invention.

FIG. 6 illustrates a transformer 300 according to another embodiment of the present invention. The transformer 300, similar to the transformer 200 shown in FIG. 2, may also include the first winding T1 (with the first number of turns n1), the second winding T2 (with the second number of turns n21), the third winding T22 (with the first number of turns n22), the first switch SW1, the first current direction control unit D21, the second current direction control unit D22, the loading capacitor C1, the second switch SWp, the PWM unit PWM and the resistor $R_{OCP}$. The coupling relationships and related operation is not described repeatedly. The transformer 300 may further include a fourth winding T23 (having a first terminal T23a, a second terminal T23b and a fourth number of turns n23) disposed at the secondary side, a third current direction control unit D23 (having a first terminal D23a coupled to the first terminal T23a, and a second terminal D23b coupled to output voltage terminal $V_{OUT}$), and a third switch SW2 (having a first terminal SW2a coupled to the second terminal T23b, a second terminal SW2b coupled to the first terminal D21a, and a control terminal SW2c for receiving a third switch control signal V2). Comparing the transformer 300 with the transformer 200, the transformer 300 may be used for outputting the low voltage (e.g. 5V), a first high voltage (e.g. 20V) and a second high voltage (e.g. 12V) since the transformer 300 further include the fourth winding T23, the third switch SW2 and the third current direction control unit D23.

Figure 7:
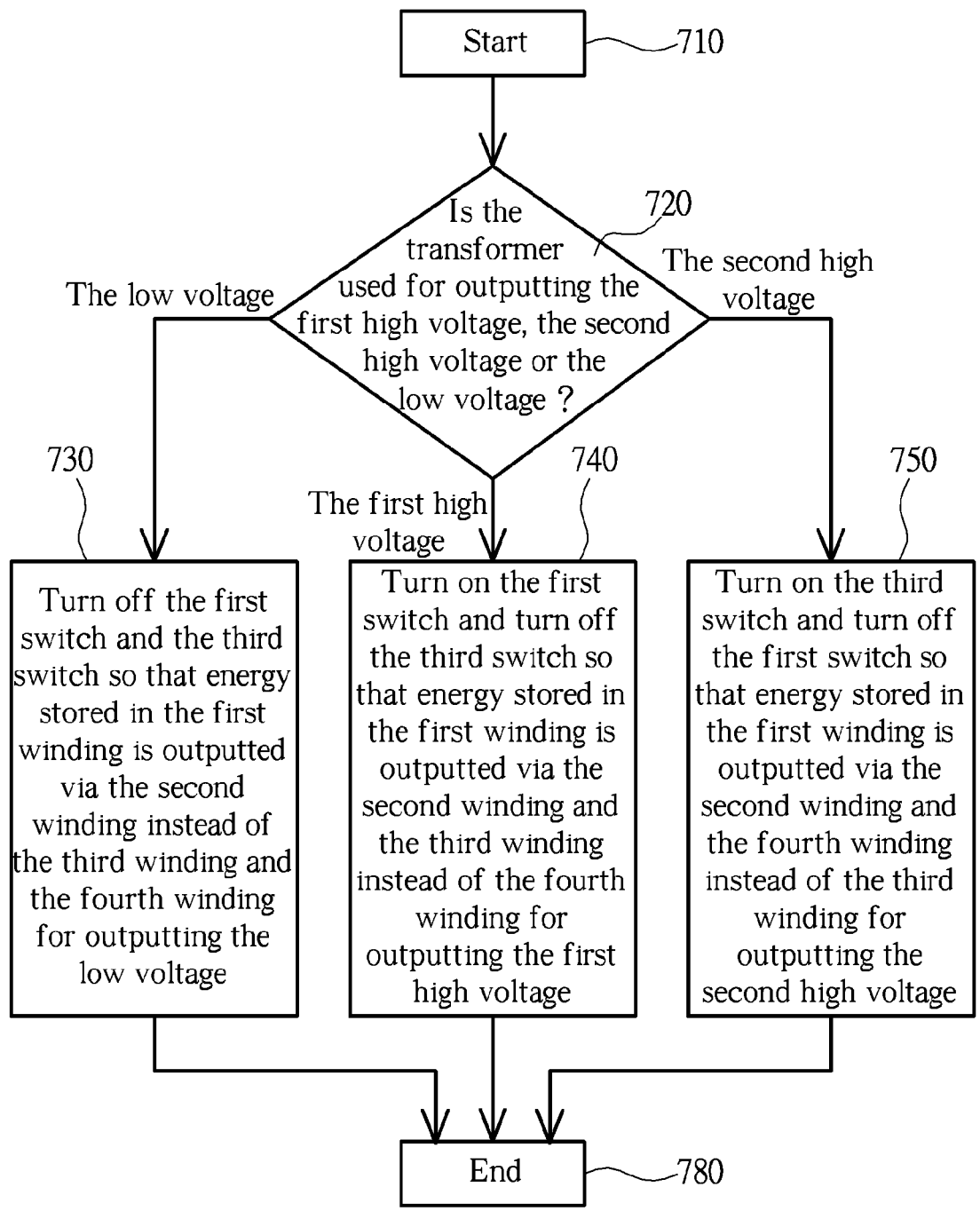
FIG. 7 illustrates a flow chart of a control method for controlling the transformer shown in FIG. 6.

FIG. 7 illustrates a flow chart of a control method 700 for controlling the transformer 300 shown in FIG. 6. The control method 700 may include the following steps.

Step 710: start;

Step 720: Is the transformer 300 used for outputting the first high voltage, the second high voltage or the low voltage? If it is for outputting the low voltage, go to step 730, if it is for outputting the first high voltage, go to step 740; and if it is for outputting the second high voltage, go to step 750

Step 730: turn off the first switch SW1 and the third switch SW2 so that energy stored in the first winding T1 is outputted via the second winding T21 instead of the third winding T22 and the fourth winding T23 for outputting the low voltage at the output voltage terminal $V_{OUT}$; go to step 780;

Step 740: turn on the first switch SW1 and turn off the third switch SW2 so that energy stored in the first winding T1 is outputted via the second winding T21 and the third winding T22 instead of the fourth winding T23 for outputting the first high voltage at the output voltage terminal $V_{OUT}$; go to step 780;

Step 750: turn on the third switch SW2 and turn off the first switch SW1 so that energy stored in the first winding T1 is outputted via the second winding T21 and the fourth winding T23 instead of the third winding T22 for outputting the second high voltage at the output voltage terminal $V_{OUT}$; go to step 780;

Step 780: end.

For example, the said fourth number of turns may be 5. Table-β illustrates the settings for transformer 300 when attempting to output the low voltage, the first high voltage and the second high voltage.

TABLE β

| Attempted Output voltage | Setting of the first switch SW1 | Setting of the third switch SW3 | The number of turns of the primary side | The number of turns of the secondary side | The winding ratio of the primary side to the secondary side | The duty cycle of the PWM signal $V_{PWM}$ (The ideal value is 50%.) |
|---|---|---|---|---|---|---|
| 5 volt (The low voltage) | Turned off | Turned off | 48 (the first number of turns n1) | 3 (the second number of turns n21) | 48/3 | 47.3% |
| 20 volt (the first high voltage) | Turned on | Turned off | 48 (the first number of turns n1) | 10 (the second number of turns n21 + the third number of turns n22) | 48/10 | 49.7% |
| 12 volt (the second high voltage) | Turned off | Turned on | 48 (the first number of turns n1) | 8 (the second number of turns n21 + the fourth number of turns n23) | 48/8 | 48.5% |

The explanation of the steps 730 and 740 is similar to the steps 530 and 540, so it is not repeated again. In step 750, the first switch SW1 is turned off so that the third winding T22 does not operate, and the first current direction control unit D21 is not conductive for reverse bias. The number of turns of the secondary side of the transformer 300 is a sum of the second winding and the fourth winding, that is, 3+5=8 in the present example. Hence, the winding ratio of the transformer 300 may be 48/8. The duty cycle of the PWM signal $V_{PWM}$ corresponding to the 48/8 winding ratio and the second high voltage (e.g. 12V) may be 48.5% that is close to the ideal value 50%.

Likewise, the third current direction control unit D23 may be (but not limited to) a diode, the first terminal D23a may be an anode, and the second terminal D23b may be a cathode. The third current direction control unit D23 may be a set of diodes connected in series, or other sorts of device able to control current direction. In FIGS. 2 and 6, the polarity of the winding(s) at the primary side is opposite of the polarity of the winding(s) at the secondary side. Hence, the polarity of the first winding T1 is opposite of the polarity of the second winding T21, the third winding T22 and the fourth winding T23.

Since the waveforms on the winding at the primary side of a transformer (e.g. the first winding T1 in FIG. 2) and the winding at the secondary side of the transformer (e.g. the third winding T22 in FIG. 2) may have positive half waveforms and negative half waveforms, the said switch devices such as the first switch SW1, the second switch SW2 and the third switch SW3 may be switch devices allowing both positive half waveforms and negative half waveforms to flow through. According to an embodiment of the present invention, the switch devices may be (but not limited to) relay devices. A user may adopt a suitable sort of switch device for the transformer to operate well.

By adopting a transformer and a control method disclosed according to an embodiment of the present invention, the stability of the duty cycle of the PWM signal $V_{PWM}$ can be kept without being effected when adjusting the level of the output voltage. The duty cycle may be kept close to the ideal value by adjusting the number of turns of the windings at the secondary side. Unwanted oscillation, overheat and incorrect operation can be effectively avoided. In summary, the transformers and control methods disclosed by the present invention can solve the shortages of the prior art effectively.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A transformer, comprising:
   a first winding disposed at a primary side, having a first number of turns, comprising a first terminal coupled to an input voltage terminal, and a second terminal coupled to a first ground;
   a second winding disposed at a secondary side, having a second number of turns, comprising a first terminal, and a second terminal coupled to a second ground;
   a first current direction control unit comprising a first terminal coupled to the first terminal of the second winding, and a second terminal coupled to an output voltage terminal;
   a third winding disposed at the secondary side, having a third number of turns, comprising a first terminal and a second terminal;
   a second current direction control unit comprising a first terminal coupled to the first terminal of the third winding, and a second terminal coupled to the output voltage terminal;
   a first switch comprising a first terminal coupled to the second terminal of the third winding, a second terminal coupled to the first terminal of the second winding, and a control terminal configured to receive a first switch control signal;
   a loading capacitor comprising a first terminal coupled to the output voltage terminal, and a second terminal coupled to the second ground;
   a fourth winding disposed at the secondary side, having a fourth number of turns and comprising a first terminal, and a second terminal;
   a third current direction control unit comprising a first terminal coupled to the first terminal of the fourth winding, and a second terminal coupled to the output voltage terminal; and
   a third switch comprising a first terminal coupled to the second terminal of the fourth winding, a second terminal coupled to the first terminal of the first current direction control unit, and a control terminal configured to receive a third switch control signal.

2. The transformer of claim 1, wherein
   the first current direction control unit is a first diode, the first terminal of the first current direction control unit is an anode of the first diode, and the second terminal of the first current direction control unit is a cathode of the first diode; and
   the second current direction control unit is a second diode, the first terminal of the second current direction control unit is an anode of the second diode, and the second terminal of the second current direction control unit is a cathode of the second diode.

3. The transformer of claim 1, wherein: when the first switch is turned off, a first current flows from the first terminal of the first current direction control unit to the second terminal of the first current direction control unit so as to charge the loading capacitor and generate a low voltage at the output voltage terminal; and
   when the first switch is turned on, a second current flows from the first terminal of the second current direction control unit to the second terminal of the first current direction control unit so as to charge the loading capacitor and generate a high voltage at the output voltage terminal.

4. The transformer of claim 1, further comprising:
   a second switch comprising a first terminal coupled to the second terminal of the first winding, a second terminal coupled to the first ground, and a control terminal;
   a pulse-width modulation unit comprising:
     a first terminal coupled to the control terminal of the second switch, configured to output a pulse-width modulation signal to the control terminal of the second switch;
     a second terminal coupled to the second terminal of the second switch so that the pulse-width modulation unit monitors a voltage level of the second terminal of the second switch; and
     a resistor coupled between the second terminal of the second switch and the first ground.

5. The transformer of claim 1, wherein the third current direction control unit is a diode, the first terminal of the third current direction control unit is an anode of the diode, and the second terminal of the third current direction control unit is a cathode of the diode.

6. The transformer of claim 1, wherein polarity of the first winding is opposite of polarity of the second winding, the third winding and the fourth winding.

7. A transformer control method for controlling a transformer, the transformer comprising a first winding disposed at a primary side, a second winding disposed at a secondary side, a third winding disposed at the secondary side, a first switch coupled between the second winding and the third winding, a fourth winding disposed at the secondary side, and a third switch coupled between the second winding and the fourth winding, the method comprising:
   turning off the first switch when the transformer is configured to output a low voltage so that energy stored in the first winding is outputted via the second winding instead of the third winding;

turning on the first switch when the transformer is configured to output a first high voltage so that energy stored in the first winding is outputted via the second winding and the third winding;

turning on the third switch and turning off the first switch when the transformer is configured to output a second high voltage so that energy stored in the first winding is outputted via the second winding and the fourth winding instead of the third winding;

wherein the third switch is turned off when the transformer is configured to output the low voltage so that energy stored in the first winding is outputted without going via the fourth winding; and the third switch is turned off when the transformer is configured to output the first high voltage so that energy stored in the first winding is outputted without going via the fourth winding.

8. A transformer, comprising:

a first winding disposed at a primary side, having a first number of turns, comprising a first terminal coupled to an input voltage terminal, and a second terminal coupled to a first ground;

a second winding disposed at a secondary side, having a second number of turns, comprising a first terminal, and a second terminal coupled to a second ground;

a third winding disposed at the secondary side, having a third number of turns, comprising a first terminal and a second terminal;

a first switch comprising a first terminal coupled to the second terminal of the third winding, a second terminal coupled to the first terminal of the second winding, and a control terminal configured to receive a first switch control signal;

a loading capacitor comprising a first terminal coupled to an output voltage terminal, and a second terminal coupled to the second ground;

a fourth winding disposed at the secondary side, having a fourth number of turns and comprising a first terminal, and a second terminal;

a third current direction control unit comprising a first terminal coupled to the first terminal of the fourth winding, and a second terminal coupled to the output voltage terminal; and a third switch comprising a first terminal coupled to the second terminal of the fourth winding, a second terminal coupled to a first terminal of a first current direction control unit, and a control terminal configured to receive a third switch control signal;

wherein a first current generated according to the second winding flows to charge the loading capacitor when the first switch is turned off, and a second current generated according to the second winding and the third winding flows to charge the loading capacitor when the first switch is turned on.

9. The transformer of claim 8, further comprising:

the first current direction control unit comprising the first terminal coupled to the first terminal of the second winding, and a second terminal coupled to an output voltage terminal; and a second current direction control unit comprising a first terminal coupled to the first terminal of the third winding, and a second terminal coupled to the output voltage terminal.

10. The transformer of claim 9, wherein the first current direction control unit is a first diode, the first terminal of the first current direction control unit is an anode of the first diode, and the second terminal of the first current direction control unit is a cathode of the first diode; and the second current direction control unit is a second diode, the first terminal of the second current direction control unit is an anode of the second diode, and the second terminal of the second current direction control unit is a cathode of the second diode.

11. The transformer of claim 9, wherein:

when the first switch is turned off, the first current flows from the first terminal of the first current direction control unit to the second terminal of the first current direction control unit so as to charge the loading capacitor and generate a low voltage at the output voltage terminal; and when the first switch is turned on, the second current flows from the first terminal of the second current direction control unit to the second terminal of the first current direction control unit so as to charge the loading capacitor and generate a high voltage at the output voltage terminal.

12. The transformer of claim 8, further comprising:

a second switch comprising a first terminal coupled to the second terminal of the first winding, a second terminal coupled to the first ground, and a control terminal;

a pulse-width modulation unit comprising:

a first terminal coupled to the control terminal of the second switch, configured to output a pulse-width modulation signal to the control terminal of the second switch; a second terminal coupled to the second terminal of the second switch so that the pulse-width modulation unit monitors a voltage level of the second terminal of the second switch; and a resistor coupled between the second terminal of the second switch and the first ground.

13. The transformer of claim 8, wherein the third current direction control unit is a diode, the first terminal of the third current direction control unit is an anode of the diode, and the second terminal of the third current direction control unit is a cathode of the diode.

14. The transformer of claim 8, wherein polarity of the first winding is opposite of polarity of the second winding, the third winding and the fourth winding.

* * * * *